United States Patent Office 3,092,602
Patented June 4, 1963

3,092,602
PLASTICIZING OF PHENOL RESINS
Hans Wille, Hans Schuhmann, and Karl Jellinek, Duisburg-Meiderich, Germany, assignors, by mesne assignments, to Koppers Company, Inc., a corporation of Delaware
No Drawing. Filed May 20, 1960, Ser. No. 30,465
3 Claims. (Cl. 260—31.8)

The invention concerns the plasticization of phenol-aldehyde resins.

Phenol resins, that is condensation masses made from, for example, phenol, cresols, xylenols, to which are added aldehydes, for example, formaldehyde, acetaldehyde, benzaldehyde, trioxymethylene, find manyfold uses in the most varied industries; for some uses the appreciable brittleness of these resins is a hindrance.

It is known to add softeners, for example glycol, glycerine esters of phthalic acid, adipic acid, sebacic acid and the like to such resins. These additives do give the phenol resins an increased softness, but at the same time other desired properties of the products manufactured from the plasticized resins are harmed. For example, in the case of the paper laminates used in the electrical industry, the plasticizers previously used lead to an increased ability to absorb water and to a decrease in dielectric values, particularly, when used in damp areas. What is desired for example, for making pressed switch parts, is a phenol resin paper laminate with excellent electrical properties, which may be punched or dip-soldered without prewarming and which causes no corrosion of bright metal parts under electrical tension in sub-tropical conditions. These properties cannot be met either with or without the use of known plasticizers.

It has now been found that low molecular weight indene polymers have a plasticizing action on phenol-resins, in particular on resoles, and also improve their electrical properties, decrease the tendency of paper laminates made with them to absorb water and to decrease electro-corrosion. It has been further found that the plasticizing action can be increased without influencing their other actions by the simultaneous addition of low molecular weight polyesters.

An objective of the invention is, therefore, the use of low molecular weight indene polymers as plasticizers for phenol-, cresol-, xylenol- and alkyl phenol-aldehyde condensates, possibly together with esters or polyesters, preferably low molecular weight polyesters, especially those of adipic acid. A further objective of the invention is a mixture yielding resites of high softening point and unimpaired electrical qualities from a hardenable phenol-, cresol-, xylenol-, or alkyl phenol-aldehyde condensation product or from similar unhardenable condensation product (novolak) together with a hardener, as for example, hexamethylenetetramine and a low molecular weight indene polymer and preferably an ester or polyester, especially a low molecular weight polyester for example of adipic acid and possible also additions such as solvents.

Indene polymers have the general formula:

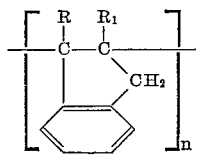

I in which R and $R_1$ can be a hydrogen, an alkyl or an aryl group and $n$ an interger from 2 to 4.

The esters or polyesters to be included have the general formula:

$$R'OOC—R—COOR''$$  II or $$R[OOC—R'—COOR'']_nOOC—R—COOR'''$$  III in which R, R', and R''' represent aliphatic, aromatic, cycloaliphatic, mixed aliphatic aromatic or aliphatic-cycloaliphatic hydrocarbon residues or radicals of aliphatic ethers, polyethers, thioethers and dialkylamines and (Formula III) $n$ is an integer from 1 to 6.

The amount of added indene polymer depends upon the desired properties of the resin and of the hardened product. The amount added can advantageously be in the range of 0.5–1.0:1.0 based on phenol resin, the same is recommended for the amount added of indene polymers together with esters or polyesters. In this, the relation of indene polymers to polyesters can vary with advantage from 1:2 to 2:1 depending upon the amount of softening desired.

The following examples illustrate recommended ways of carrying out the invention.

Example I

One hundred parts of a cresol-resole resin are dissolved in spirit and mixed with 30 parts of a mixture of polymeric glycol-adipic acid ester and dimerized indene. Cotton paper is impregnated with this solution and hot-pressed after drying. The electrical laminate so obtained had a water absorption of only barely 1%, a corrosion value A/B 1.2 . . . 1.4, a resistance between plugs of $5 \times 10^{10}$ ohms and a loss angle at 1 megacycle frequency of $25 \times 10^{-3}$. If, instead, 100 parts of the cresol resin solution were mixed with 30 parts of the polyester without the addition of the indene dimer, and otherwise similarly handled, the electrical laminate so obtained had a water absorption according to DIN 53 472 of 2%, a corrosion value according to DIN 53 489 of B/2–3, a resistance between plugs according to procedure a+B of DIN 53 482 of $10^9$ ohms and a loss angle at 1 megacycle frequency of $60 \times 10^{-3}$.

Example II

One thousand grams cresol-resole resin dissolved in spirit and dividend into two parts. The one part (A) was mixed with 500 g. of a mixture of dibutylphthalate and dimerized indene; and the other part (B) mixed with 500 g. of dibutylphthalate.

Laminates were prepared from these resolutions as in Example I.

Tests on the laminates A and B gave:

| | A | B |
|---|---|---|
| Water absorption in percent | 1 | 3 |
| Corrosion | A/B 1.4 | A/B 2 ... 3 |
| Resistance | $10^{10}$ | $5 \times 10^8$ |
| Loss Angle at 1 megacycle$\times 10^3$ | 23 | 50 |

What is claimed is:
1. A composition for impregnating paper to make electrical laminates having improved dielectric properties and characterized by a maximum water absorption of one percent comprising a phenol-aldehyde resin containing an agent for imparting improved electrical properties, de- creasing the tendency of the paper laminates impregnated with said resin to absorb water, and decreasing electrocorrosion consisting essentially of a mixture of a low molecular weight indene polymer having the formula:

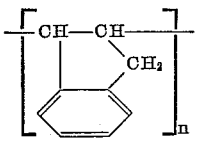

wherein $n$ is an integer having a value of from 2-4 and an ester selected from the group consisting of polyglycoladipate and dibutylphthalate, said plasticizer being present in an amount of 0.5-1.0 weight part per part of said resin and containing from 0.5-2.0 parts of said indene polymer per part of said ester.

2. A composition according to claim 1 wherein said indene polymer is dimerized indene and said ester is polyglycoladipate.

3. A composition according to claim 1 wherein said indene polymer is dimerized indene and said ester is dibutylphthalate.

References Cited in the file of this patent

UNITED STATES PATENTS

| | | |
|---|---|---|
| 2,233,406 | Fiedler | Mar. 4, 1941 |
| 2,287,513 | Corkery et al. | June 23, 1942 |
| 2,291,322 | Harvey | July 28, 1942 |
| 2,394,498 | Waldie | Feb. 5, 1946 |
| 2,912,406 | Less et al. | Nov. 10, 1959 |

OTHER REFERENCES

Ellis, "Chemistry of Synthetic Resins," vol. 1, page 100, published by Reinhold, New York (1935).

The Merck Index, 7th ed., May 2, 1960 (copy in Div. 50), pages 552-553.

Buttrey: Plasticizers, Cleaver-Hume Press, London, 1950 (copy in Div. 50), pages 71-75.